Aug. 4, 1964       H. A. FULTON       3,142,845
CLOSE-COUPLED TANK TO WATER CLOSET
Filed June 21, 1963
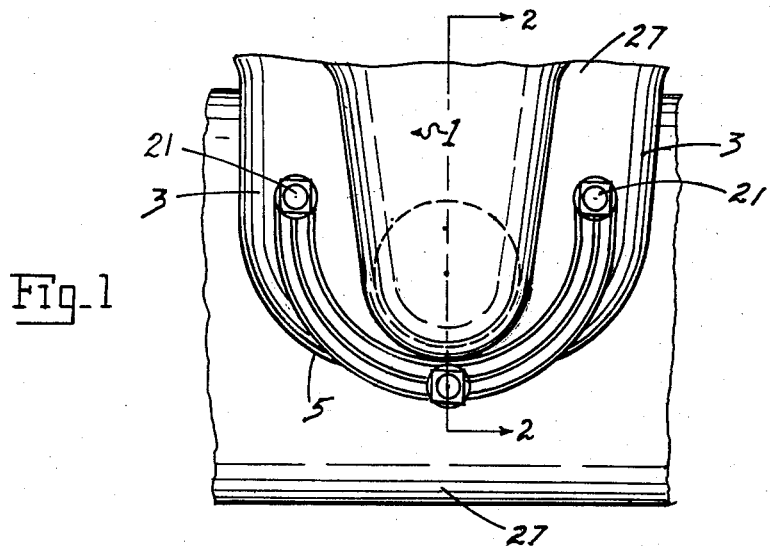
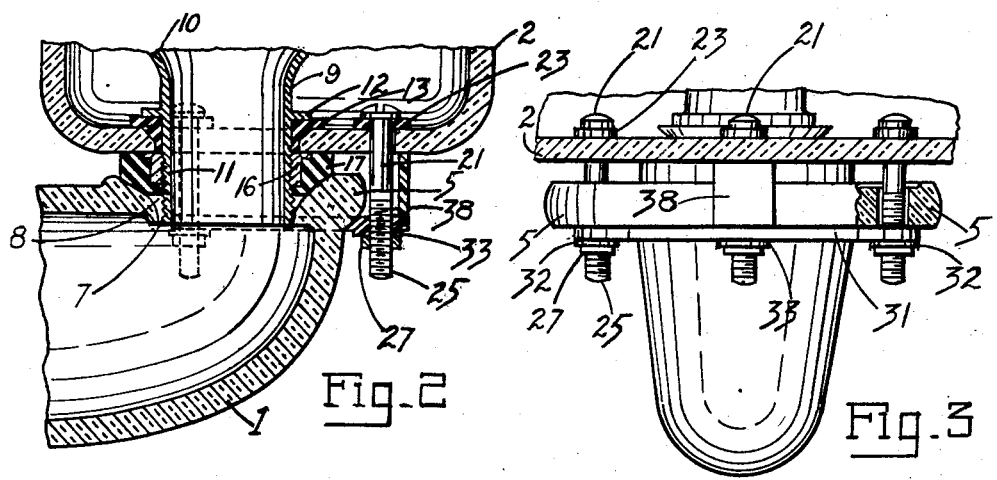
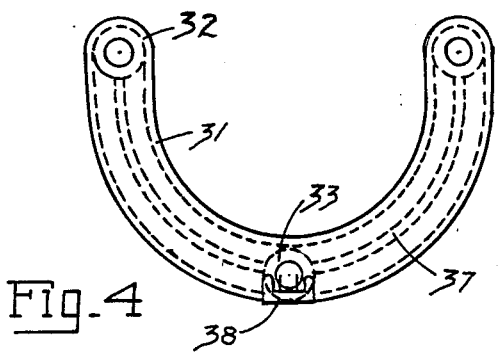
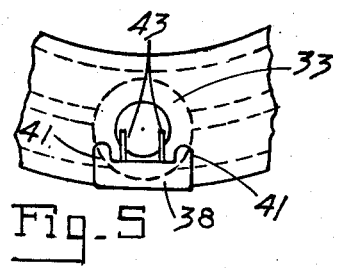
INVENTOR.
HOWARD A. FULTON
BY
WATTS & FISHER
ATTORNEYS

United States Patent Office 3,142,845
Patented Aug. 4, 1964

3,142,845
CLOSE-COUPLED TANK TO WATER CLOSET
Howard A. Fulton, Perrysville, Ohio, assignor to
Mansfield Sanitary, Inc.
Filed June 21, 1963, Ser. No. 289,661
4 Claims. (Cl. 4—12)

This invention relates generally to the art of close-coupled water closet combinations and is particularly concerned with a new combination of elements for connecting and holding the tank and bowl in assembled relation.

Heretofore, the tanks of close-coupled closets have been mounted on the bowls with, or without, a gasket between and spacing the bowl and tank apart, and the tank was held in assembled position relative to the bowl by a pair of bolts which extend through the bottom wall of the tank and through flanges extending laterally outward on opposite sides of the inlet to the bowl. When nuts on the bolts were drawn up against the underside of the flanges, the tank was connected to the bowl. When the tank was to rest directly on the bowl, accurate grinding of one or both of the engaging porcelain or ceramic surfaces was required to insure proper alignment and leveling of the tank. When a gasket was positioned between the tank and bowl, the need for grinding the surfaces of either the tank or bowl was avoided but the flexibility of the gasket created a problem in satisfactorily aligning, leveling and connecting the tank to the bowl.

One solution of that difficulty is disclosed and claimed in the patent to Smith, No. 2,590,471. In the closet of that patent, a third bolt was extended through the bottom wall of the tank and down past the short, rearwardly extending part of the flange on the bowl and that bolt was connected to a metal clip which was held in contact with the undersurface of the short flange by a metal wire which was anchored at its ends to the side bolts. Long continued use of the device of that patent disclosed an unexpected disadvantage, namely, the corrosion of the wire and loss of retention of the clip under the rear flange.

The present invention aims to solve the above mentioned problem in a somewhat different manner and attains that aim by the new combination of elements set forth in the following specification, one form of which is illustrated in the drawings accompanying and forming a part thereof, in which:

FIG. 1 is a fragmentary bottom plan view of a bowl and tank combination embodying a preferred form of the present invention;

FIG. 2 is a fragmentary, vertical, sectional view taken on line 2—2 of FIG. 1;

FIG. 3 is a fragmentary, rear side, elevational view, partly in section of the combination of FIGS. 1 and 2;

FIG. 4 is a top plan view of part of the adapter constituting part of the means for connecting the bowl to the tank; and, FIG. 5 is an enlarged fragmentary view showing part of the adapter of FIG. 4.

In the figures, the rearwardly projecting part of a toilet bowl is indicated at 1 and the tank is indicated at 2. The bowl 1 is provided with the usual flanges 3 projecting laterally on opposite sides of the portion 1 of the bowl and the smaller, rearwardly projecting flange 5. Part 1 of the bowl has a water inlet opening 7 partly defined by an annular, upwardly and outwardly diverging surface 8.

The tank 2 has a spud 9 which is provided with a valve seat 10 at its upper end and has a lower end 11 extending through a hole in the bottom wall of the tank and into the opening 7 in the bowl. This spud has an outwardly extending flange 12 disposed within the tank and engageable on the top of an annular gasket 13 which is shaped to engage the surfaces of the spud-receiving hole through the tank wall and to prevent the egress of water therethrough. The lower end 11 of spud 9 is threaded and carries a nut 16 which is fixedly connected to a gasket 17, the latter being pressed against the outside of the bottom wall of the tank when nut 16 is rotated on the spud. Such rotation draws the spud and gasket 13 down into sealing engagement with the inside of the tank and forces the gasket 17 up against the outside of the tank, thereby preventing egress of water from the tank around the spud. On its lower side, gasket 17 is shaped to seat on the curved surface 8 which partly defines opening 7.

The tank is provided with a plurality of holes in the tank, in this case three, through which bolts 21 extend. Gaskets 23 around each bolt serve to prevent egress of water from the tank through those holes and around the bolts. The lower ends of the bolts are threaded as at 25 and nuts 27 are screwed thereon. The bolts on opposite sides of the portion 1 of the bowl extend through holes in the flanges 3 and the third bolt extends down past flange 5.

An adapter 31 which is generally U-shaped in plan view is provided with bosses 32 at its ends and a boss 33 approximately midway between its ends, each boss being provided with holes through which bolts 21 extend. Between the bosses the adapter is of reduced thickness but is provided with reinforcing ribs 37. Adapter 31 is shaped to engage with the underside of flanges 3 and 5, as is clearly shown in FIG. 3. The adapter is also provided with a projection 38 which extends upwardly from mid-boss 33 and is long enough to engage the bottom of the tank when the parts are in assembled position. Narrow, parallel flanges 41 extend lengthwise of, and forwardly from, projection 38 to engage opposite sides of nut 27 and prevent the nut from turning when the bolt 21 is turned in the nut. Small feathers or probes 43 extend forwardly from projection 38 between flanges 41. As is shown in FIG. 5, these feathers extend into a projection of the bolt hole through boss 33 and will engage opposite sides of bolt 25 in that hole.

When the bolts 21 are screwed into the nuts 27, the adapter 31 is pressed against the underside of the flanges 3 and 5 and the bowl is pressed against the gasket 17 with resultant attachment of the tank to the bowl. The adapter is anchored in position under the flanges by the bolts in bosses 32 and leveling of the tank is accomplished by adjusting the several bolts.

In assembling the adapter 31 with bolts 21 and nuts 27, the bolts are placed in the holes in the tank and flanges and the adapter is moved upwardly to bring the opposite side bolt into the holes in bosses 32. The mid-boss 38 is moved upwardly so that the rear bolt passes through the hole in that boss and the feathers or probes 43 are brought into frictional engagement with the sides of the bolt, this engagement being sufficient to retain the adapter on the bolt. Nuts are then screwed onto each of the three bolts and finally tightened by rotation of the bolts as by means of a screw driver in the notches in the heads of the screws.

The upper end of the projection 38 and strengthening flanges 41 engage the undersurface of the tank and prevents distortion or breakage of the adapter when the rear bolt is tightened in its nut.

The adapter 31 is composed of material which is substantially non-conductive electrically and is resistant to corrosion, for example a plastic material. While various plastics are suitable for the purpose, polypropylene is preferred.

It will be seen from the foregoing that the adapter 31 is not only resistant to corrosion but is also resistant to breakage or deformation by forces exerted by the nuts and bolts. Since the material constituting the adapter is electrically non-conductive, corrosion of the type mentioned above in connection with the apparatus of Patent No. 2,590,471 is avoided.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents of, or modifications of, or substitutions for, parts of the above specifically described embodiment of the invention may be made without departing from the scope of the invention as set forth in what is claimed.

What is claimed is:

1. A close-coupled water closet combination comprising a toilet bowl having outwardly projecting side and rear flanges, a tank and means for securing said tank in assembled relation to said bowl, said means including side and rear bolts extending through the bottom wall of the tank and nuts on the bolts, the side bolts extending through the side flanges and the rear bolt extending down past the rear flange, and a generally U-shaped adapter engaging the underside of said flanges and having bosses near its ends and near its middle through which said bolts extend, said adapter being composed of material which is substantially non-corrosive and non-conductive electrically.

2. The combination of elements set forth in claim 1 in which the boss near the middle of the adapter has a projection extending upwardly into engagement with the underside of the tank.

3. The combination of elements set forth in claim 1 in which parallel probes are provided on the adapter to engage opposite sides of the rear bolt and frictionally resist rotation of the bolt when a nut is screwed thereon.

4. The combination of elements set forth in claim 1 in which a spud extends through the bottom wall of the tank and into the bowl and an annular gasket surrounds the spud and engages and spaces apart the tank and bowl.

References Cited in the file of this patent

UNITED STATES PATENTS 2,700,774    Smith _____ Feb. 1, 1955